Patented Dec. 20, 1938

2,140,549

UNITED STATES PATENT OFFICE 2,140,549

PREPARATION OF 1,1,2-TRICHLOROETHANE

John H. Reilly, Midland, Mich., assignor to The Dow Chemical Company, Midland, Mich., a corporation of Michigan No Drawing. Application March 19, 1937, Serial No. 131,977

3 Claims. (Cl. 260—658)

This invention relates to processes for the preparation of 1,1,2-trichloroethane from ethylene chloride.

My improved process for the preparation of 1,1,2-trichloroethane comprises passing ethylene chloride and chlorine in certain ratios, preferably in the vapor phase, into contact with molten metal chlorides which are at a temperature in the range between about 300° C. and about 425° C. The ratio of chlorine to ethylene chloride is preferably in the range between about 0.55 and about 0.75 part by weight of chlorine per part of ethylene chloride. The ethylene chloride and chlorine may be pre-heated separately, or in admixture, to any desired temperature up to reaction temperature before they are passed into the molten salt bath.

The bath in which the reaction is carried out comprises one or more of the chlorides of aluminum, potassium, iron, sodium, bismuth, zinc, and other metals, such chloride or mixture of chlorides being freely fluid at the reaction temperature. The eutectic produced by mixing 60 parts by weight of aluminum chloride, 30 parts by weight of sodium chloride, and 10 parts by weight of ferric chloride is suitable. This eutectic has a melting point of about 150° C. and a boiling point above 1000° C. A mixture of 30 parts by weight of sodium chloride and 70 parts by weight of aluminum chloride is equally suitable. Zinc chloride can be used alone as the bath. The reaction here involved is exothermic in character and is capable of developing enough heat to maintain the salt bath at temperatures in the range above given under ordinary conditions. In fact, cooling may be necessary when high rates of flow of reactants are employed.

The following example illustrates the practice of my invention: The bath employed was composed of 36 parts by weight of potassium chloride and 64 parts by weight of aluminum chloride. It was approximately 6 inches in depth and weighed 10.0 pounds. A mixture of ethylene chloride and chlorine in the ratio of about 0.73 part by weight of chlorine per part of ethylene chloride was continuously led into the bottom of said bath at a substantially uniform rate of about 1270 grams per hour, the bath being maintained at a temperature of about 350° C.

The gaseous reaction product was cooled to condense therefrom the chlorinated reaction product, of which 911 grams per hour was collected, and the exit gases were scrubbed with water to recover the hydrogen chloride. The chlorinated product was fractionally distilled and found to have the following composition: 1,1,2-trichloroethane 49.5 per cent by weight, dichloroethylenes 7.5 per cent, unreacted ethylene chloride 23.2 per cent, and other chloro compounds 12.8 per cent. This represents a yield of 64 per cent of theoretical of 1,1,2-trichloroethane, based on the ethylene chloride reacted.

By operating in a like bath at a temperature of about 400° C., and a chlorine to ethylene chloride ratio of 0.6 to 1.0, I have obtained results similar to those shown in the above example.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of preparing 1,1,2-trichloroethane from ethylene chloride, the step which consists in passing chlorine and ethylene chloride, in the ratio of between about 0.55 and about 0.75 part by weight of chlorine per part of ethylene chloride, into a bath of molten metal chlorides maintained at a temperature between about 300° and about 425° C.

2. In preparing 1,1,2-trichloroethane, the steps which consist in pre-heating ethylene chloride to a temperature not substantially above 300° C., admixing chlorine therewith in the ratio between about 0.55 and about 0.75 part by weight of chlorine per part of ethylene chloride, and passing said mixture into a bath of molten metal chlorides maintained at a temperature between about 300° and about 425° C.

3. In preparing 1,1,2-trichloroethane, the step which consists in passing a mixture consisting of about 0.6 part by weight of chlorine per part of ethylene chloride into a bath of molten metal chlorides maintained at a temperature of about 350° C.

JOHN H. REILLY.